US007095008B2

United States Patent
Klingelhoefer et al.

(10) Patent No.: US 7,095,008 B2
(45) Date of Patent: Aug. 22, 2006

(54) PROTECTIVE DEVICE WORKING IN A CONTACT FREE MANNER

(75) Inventors: Christian Klingelhoefer, Freiburg (DE); Manfred Haberer, Riegel (DE); Ana Maestro, Freiburg (DE); Georg Plasberg, Bahlingen (DE)

(73) Assignee: Sick AG, Waldkirch/Breisgau (DE)

( * ) Notice: Subject to any disclaimer, the term of this patent is extended or adjusted under 35 U.S.C. 154(b) by 411 days.

(21) Appl. No.: 10/327,600

(22) Filed: Dec. 19, 2002

(65) Prior Publication Data

US 2003/0122062 A1 Jul. 3, 2003

(30) Foreign Application Priority Data

Dec. 21, 2001 (DE) .................................. 101 63 537

(51) Int. Cl.
*G06M 7/00* (2006.01)

(52) U.S. Cl. ........................................ 250/221; 340/555
(58) Field of Classification Search ......... 340/555–557, 340/541; 250/221, 222.1; 345/555–557, 541
See application file for complete search history.

(56) References Cited

U.S. PATENT DOCUMENTS

| 3,739,372 A | * | 6/1973 | Schlisser et al. ............ 340/556 |
| 2001/0041077 A1 | | 11/2001 | Lehner et al. | |
| 2002/0017604 A1 | * | 2/2002 | Nakazaki et al. ............ 250/221 |

FOREIGN PATENT DOCUMENTS

| DE | 2343096 A1 | 3/1975 |
| DE | 3790010 C2 | 7/1987 |
| DE | 4233810 C2 | 4/1994 |
| DE | 4422497 A1 | 1/1996 |
| DE | 4422497 C2 | 1/1996 |
| DE | 4424537 A1 | 1/1996 |
| DE | 29920715 U1 | 2/2000 |
| JP | 10166192 A | 6/1998 |
| JP | 2000107899 A | 4/2000 |
| WO | WO 87/04259 A1 | 7/1987 |

\* cited by examiner

*Primary Examiner*—Stephone B. Allen
(74) *Attorney, Agent, or Firm*—Townsend and Townsend and Crew LLP

(57) ABSTRACT

A protective device working in a contact-free manner for the securing of a danger zone of a machine or the like comprises an optical evaluation field and a control and evaluation device which allows, in addition to a securing operation, in which a warning or machine stop signal is generated as a result of a respective intrusion into the evaluation field, a cyclical operation in which a release signal is generated as a result of at least one respective intrusion into the evaluation field in order to release a respective machine cycle, with one and the same evaluation field being provided for securing operation and for cyclical operation and with the control and evaluation device being designed such that only a part of the evaluation field is monitored accordingly both for securing operation and cyclical operation.

11 Claims, 2 Drawing Sheets

PROTECTIVE DEVICE WORKING IN A CONTACT FREE MANNER

BACKGROUND OF THE INVENTION

The invention relates to a protective device working in a contact-free manner for the securing of a danger zone of a machine or the like.

Known safety light grids serve, among other things, for the protection of a respective operator or other persons against dangers which arise from machinery or the like, for example as a result of fast movements of mechanical parts such as with presses. A corresponding safety light grid is set forth, for example, in IEC 61496. A protective optical field is produced by a plurality of transmitter and receiver elements. It can be formed, for example, between transmitter and receiver units separated from one another or, for example, between a combined transmitter/receiver unit arranged on a side of the protective field and a reflector unit. A respective intrusion into the protective optical field, or the interruption associated therewith of at least one light ray, as a rule results in a switching off of the so-called secure outputs (OSSDs=output signal switching devices) of the protective device working in a contact-free manner. A machine stop is triggered by a direct linking of these outputs in the stop circuit of the machine in question on a corresponding intrusion into the protective optical field.

So-called "intelligent" light grids (cf. e.g. DE 44 24 537 A1) have additional functions such as "blanking" (blocking out of defined regions) and "reduced triggering" which make it possible for the triggering of an alarm or of a switch-off signal, which would normally take place, to be prevented for certain intrusions into the protective optical field.

Light grids have also already been proposed with additional functions such as a "cycle control" or a "PDSI" (presence sensing device initiation) which can be used with machines which run through individual cycles which are only started after release by means of an electrical signal. One or more intrusions into the protective field can now be utilized during a non-dangerous part of the machine cycle for the generation of a release signal for a new machine cycle due to the cycle control or PDSI function. The intrusions into the protective field in question must take place in any case to insert and/or remove workpieces, for example, into and/or from the machine. The productivity of the machine in question can therefore be increased correspondingly by such a cycle control or PDSI function, since the previously required additional manual release of the machine is dispensed with.

A cycle control or PSDI function was previously always only used for the whole protective optical field of the light grid in question; that is, the whole protective field of the light grid was previously always used for the cycle control. However, interruptions which should be used for the cycle control are, as a rule, only those which are in the region of the hands or arms of the persons to be protected. Other interruptions can result in a false start of a machine cycle and damage the respective workpiece and/or the respective machine parts.

To be able to evaluate the regions in question differently, it would for example be possible to install two light grid systems with different protective fields and to connect them to a control unit and thus only to trigger a cycle when the light grid with the shorter protective field height corresponding to the region of the hands or arms is interrupted. Such a solution, however, now has a number of disadvantages. For instance, a corresponding design is complex and expensive. The regions in question are fixedly defined by the size and/or the protective field height of the light grids and require a great deal of construction space at the machine where, generally, there is relatively little space available.

SUMMARY OF THE INVENTION

It is an object of the invention to provide an improved protection device of the initially named kind which works in a contact-free manner and in which the aforesaid disadvantages have been eliminated.

This object is satisfied in accordance with the invention by a protective device working in a non-contact manner for the securing of a danger region of a machine or the like having an optical evaluation field and a control and evaluation device which allows operation, in addition to a securing operation, in which a warning signal or a machine stop signal is generated as a result of the respective intrusion into the evaluation field, a cyclical operation in which a release signal is generated as the result of at least one respective intrusion into the evaluation field in order to release a respective machine cycle, with one and the same evaluation field being provided for the securing operation and for the cyclical operation and the control and evaluation device being designed such that only part of the evaluation field is monitored both for the securing operation and for the cyclical operation.

One and the same optical evaluation field is therefore used for the securing operation and the cyclical operation. It is electronically divided to ensure that only a part of the optical evaluation field is correspondingly monitored for the cyclical operation.

In accordance with a preferred practical embodiment of the protective device in accordance with the invention working in a contact-free manner, the optical evaluation field in the control and evaluation unit is divided electronically into several regions which define the part regions for the securing operation and for the cyclical operation.

It is therefore precluded for an intrusion to take place during the cyclical operation into a different region than that provided for the cyclical operation resulting in the triggering of a cycle. In cyclical operation, only intrusions into the region or regions provided therefore are evaluated for a corresponding control of the machine by the control and evaluation device.

The evaluation field is preferably defined by a light grid. It would also be conceivable for the evaluation field to be defined by another arrangement working in a contact-free manner, for example by a laser scanner.

In an expedient practical embodiment, rectangular monitoring windows of different heights are preferably pre-settable for the securing operation and the cyclical operation. The monitoring window associated with cyclical operation can thus have a lower height than the monitoring window associated with the securing operation.

The monitoring window associated with securing operation and the monitoring window associated with cyclical operation preferably have the same width, with at least the monitoring window associated with the securing operation being able to be at least substantially equally as wide as the optical evaluation field defined by the light grid.

A monitoring window associated with the region of the hands or arms of persons to be protected is advantageously pre-settable for the cyclical operation.

The control and evaluation device can moreover be designed for the recognition of a pre-settable course of movement of a respective dynamic intrusion into the optical evaluation field.

It is in particular of advantage if a respective transition of an intrusion from one defined field region into another and/or the emergence from a defined field region can be recognized by means of the control and evaluation device.

In a preferred practical embodiment of the protective device in accordance with the invention working in a contact-free manner, one or more courses of movement can be pre-set, on the recognition of which the generation of a release signal of the control and evaluation device is suppressed.

The reliability of the protective device working in a contact-free manner can therefore still be increased in that the electronic control and evaluation device also monitors the transitions from one region into another. It is thus possible, for example, to interpret a hand movement downwardly out of the light grid and parallel to the light grid as a movement at which no cycle should be triggered and, accordingly, no machine cycle should be started. This not only produces greater reliability, but also greater safety. This applies, for example, to machines with mechanically weak workpiece supports wherein body parts can admittedly leave the protective field by pressing down the weak supports and thus trigger a machine cycle, but remain in the danger zone during the dangerous part of the machine cycle.

The invention will be described in more detail in the following with reference to an embodiment and the drawings.

DESCRIPTION OF THE PREFERRED EMBODIMENTS

Figure 1:
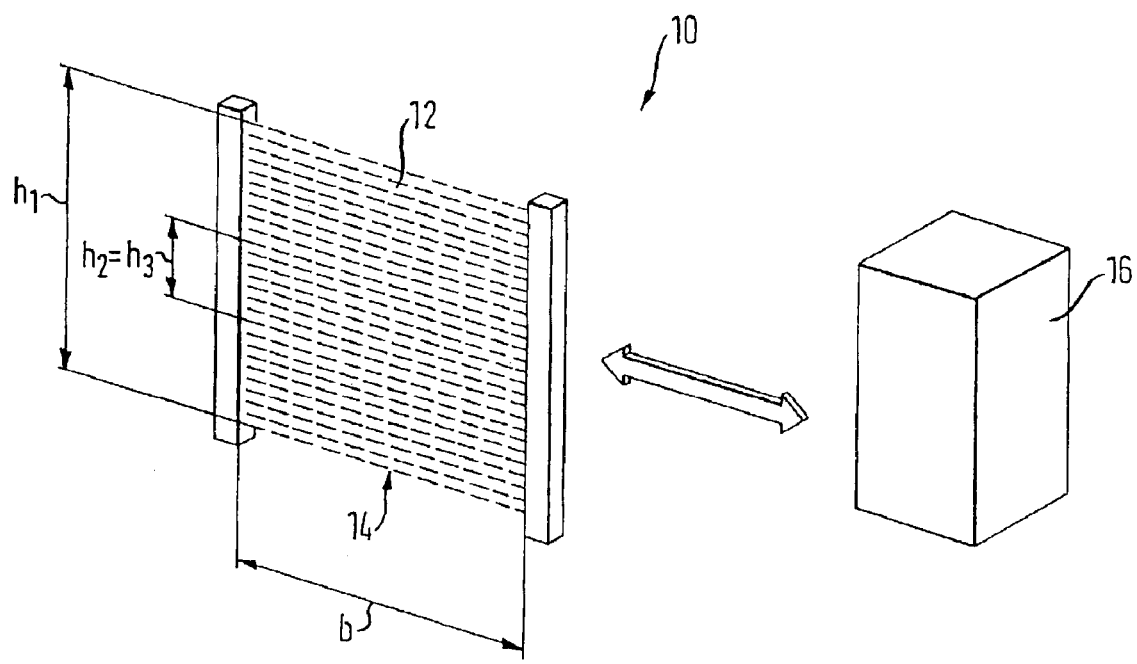
FIG. 1 is a schematic perspective representation of a protective device working in a contact-free manner in which the whole evaluation field is monitored for the securing operation and a part of this evaluation field for the cyclical operation.

FIG. 1 shows a protective device 10 working in a contact-free manner in a schematic perspective representation, which is designed for the securing of a risk zone of a machine (not shown) or the like.

It includes an optical evaluation field 12, defined e.g. by a light grid 14 and an associated control and evaluation device 16, which could also be integrated in the light grid 14.

The optical evaluation field 12 of the safety light grid 14 is formed by a plurality of transmitter and receiver elements, with the optical evaluation field 12 being able to be formed, for example, between two separate transmitter and receiver units or, for example, between a combined transmitter/receiver unit and a reflector unit.

The associated control and evaluation device 16 is designed, in addition to for safety operation, in which a warning or machine stop signal is generated as a result of a respective intrusion into the optical evaluation field 12, for a cyclical operation in which a release signal is generated as a result of at least one respective intrusion into the optical evaluation field 12 in order to release a respective machine cycle.

One and the same evaluation field 12 is provided for securing operation and for cyclical operation in this connection. The control and evaluation device 16 is designed such that only a part of the evaluation field 12 is correspondingly monitored both for securing operation and for cyclical operation.

The optical evaluation field 12 is electronically divided into a plurality of regions in the control and evaluation unit 16, the regions defining the part regions for securing operation and for cyclical operation.

Rectangular monitoring windows of different heights $h_1$ or $h_2$ can preferably be pre-settable for securing operation and for cyclical operation. The monitoring window associated with cyclical operation can thus preferably have a lower height $h_2$ than the monitoring window associated with securing operation whose height is set forth as $h_1$ in FIG. 1.

In the present embodiment, the monitoring window associated with the securing operation and the monitoring window associated with the cyclical operation have an equal width b which corresponds in the following case to the width of the protective optical field 12 defined by the light grid 14.

The monitoring window $h_2 \cdot b$ associated with cyclical operation can in particular be arranged in the region of the hands or arms of the person to be protected.

The protective field 12 of an individual light grid 14 is thus electronically divided into a plurality of regions in the control and evaluation device 16, the regions defining the part regions for securing operation and for cyclical operation. These regions are correspondingly evaluated by the electronic control and evaluation unit 16 to control the machine accordingly.

As can be seen with reference to FIG. 1, in the present embodiment, the whole evaluation field 12 is used for securing operation and part of the evaluation field 12 for cyclical operation.

Figure 2:
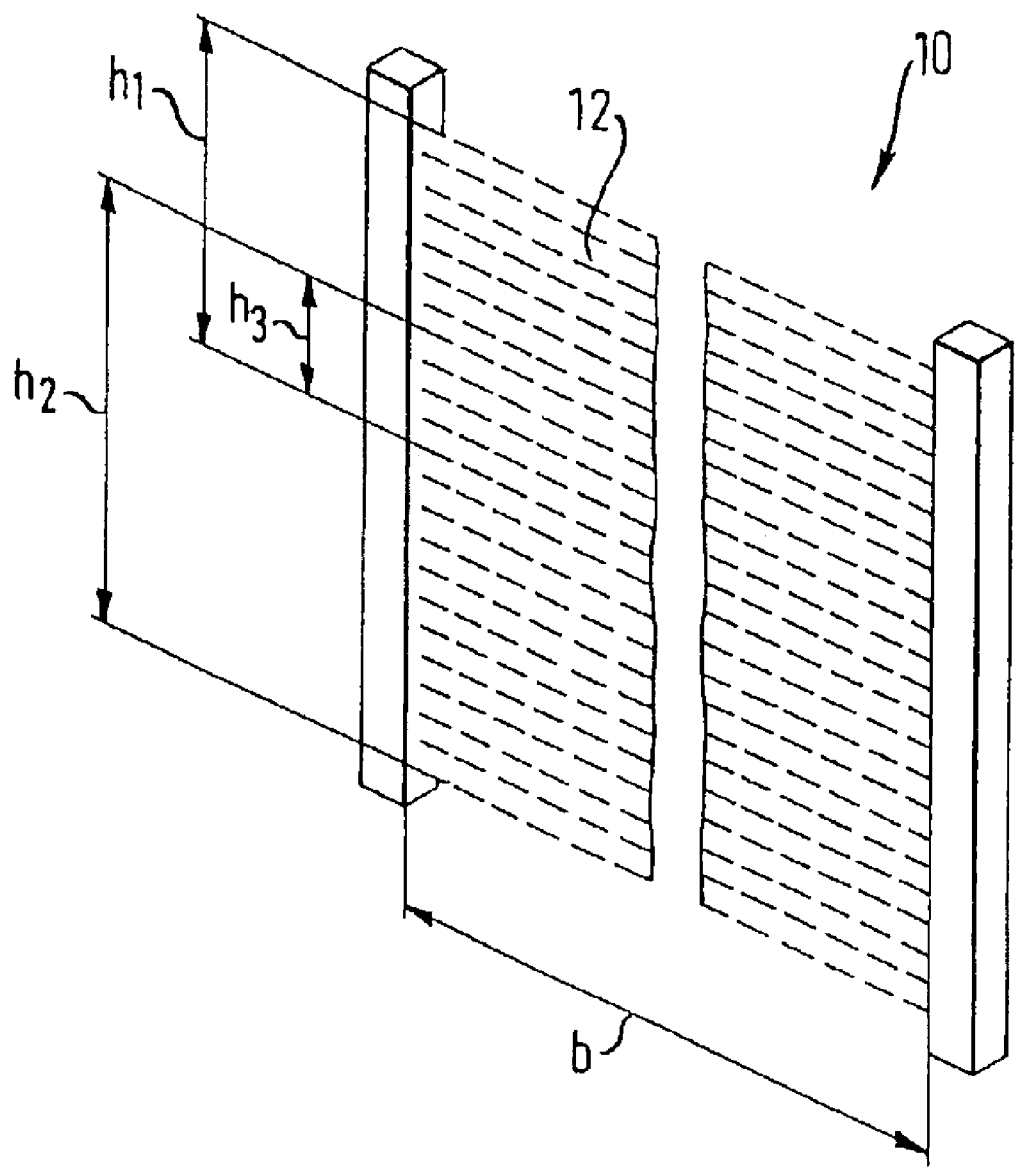
FIG. 2 is a schematic perspective representation of another embodiment of the protective device working in a contact-free manner in which only a part of the evaluation field is monitored in each case both for securing operation and for cyclical operation, with the two monitoring windows overlapping.

In contrast, an embodiment of the protective device 10 working in a contact-free manner is shown in FIG. 2 in which only part of the evaluation field 12 is monitored in each case both for securing operation and for cyclical operation. As can be recognized with reference to FIG. 2, in the present embodiment, the monitoring window $h_1 \cdot b$ intended for securing operation and the monitoring window $h_2 \cdot b$ intended for cyclical operation overlap in a region $h_3 \cdot b$. In the embodiment shown in FIG. 1, this overlapping region $h_3 \cdot b$ coincides with the monitoring window $h_2 \cdot b$.

Both in the embodiment in accordance with FIG. 1 and in the embodiment in accordance with FIG. 2, the control and evaluation device 16 (shown only in FIG. 1) is accordingly designed in each case such that only a part $h_3 \cdot b$ of the evaluation field 12 is correspondingly monitored both for securing operation and for cyclical operation.

Generally, a plurality of non-contiguous monitoring windows $h_2 \cdot b$ can also be provided for cyclical operation, with it also being possible in this case, for example, for one or more monitoring windows $h_1 \cdot b$ intended for securing operation to lie between these monitoring windows $h_2 \cdot b$ intended for cyclical operation.

The reliability of the protective device 10 working in a contact-free manner can be further increased in that the control and evaluation device 16 is moreover designed for the recognition of a pre-settable course of movement of a respective dynamic intrusion into the protective optical field 12, with in particular a respective transition of an intrusion from one defined protective field region into another and/or the emergence from a defined protective field region can also be recognized with this control and evaluation device 16. The transitions from one region into another can thus also be electronically monitored.

In particular, one or more courses of movement can also be pre-set on the recognition of which the generation of a release signal on the part of the control and evaluation device is suppressed.

Since the transitions from one region into another can, for example, also be monitored by the electronic control and evaluation device 16, it is, for example, also possible to interpret a hand movement downwardly from the light grid 14 parallel to the protective optical field 12 as a movement by which no cycle may be triggered and, accordingly, no machine cycle may be started. Not only the reliability but also the security are thus correspondingly increased. This applies, for example, to machines having mechanically weaker workpiece supports, with which it can happen that body parts admittedly leave the protective field on the pressing down of the weak support and thus trigger a machine cycle, but remain in the danger zone during the dangerous part of the machine cycle.

What is claimed is:

1. A protective device working in a contact-free manner for the securing of a danger zone of a machine, comprising an optical evaluation field and a control and evaluation device which allows, in addition to a securing operation, in which a warning or machine stop signal is produced as a result of a respective intrusion into the evaluation field, a cyclical operation in which a release signal is produced as a result of at least one respective intrusion into the evaluation field in order to release a respective machine cycle, with one and the same evaluation field being provided for the securing operation and for the cyclical operation and with the control and evaluation device being designed such that only a part of the evaluation field is monitored accordingly both for the securing operation and the cyclical operation.

2. A protective device in accordance with claim 1, characterized in that the optical evaluation field is divided electronically into a plurality of regions in the control and evaluation device.

3. A protective device in accordance with claim 1, characterized in that the evaluation field is defined by a light grid.

4. A protective device in accordance with claim 1, characterized in that rectangular monitoring windows of different heights can preferably be pre-set for the securing operation and for the cyclical operation.

5. A protective device in accordance with claim 4, characterized in that the monitoring window associated with the cyclical operation has a lower height than the monitoring window associated with the securing operation.

6. A protective device in accordance with claim 4, characterized in that the monitoring window associated with the securing operation and the monitoring window associated with the cyclical operation have an equal width.

7. A protective device in accordance with claim 1, characterized in that a monitoring window associated with the region of the hands or arms of persons can be pre-set for cyclical operation.

8. A protective device in accordance with claim 1, characterized in that the control and evaluation device is moreover designed for the recognition of a pre-settable course of movement of a respective dynamic intrusion into the optical evaluation field.

9. A protective device in accordance with claim 1, characterized in that a respective transition of an intrusion from one defined field region into an another and/or the emergence from a defined field region can be recognized by means of the control and evaluation device.

10. A protective device in accordance with claim 8, characterized in that one or more courses of movement can be pre-set on the recognition of which the generation of a release signal by the control and evaluation device is suppressed.

11. A contact-free protective device for securing a danger zone of a machine comprising an optical evaluation field and a control and evaluation device operatively coupled to the evaluation field for generating a warning or machine stop signal in response to a first intrusion of an object into the evaluation field and for generating a release signal in response to a second intrusion of an object into the evaluation field for initiating an operative machine cycle, the evaluation field and the control and evaluation device being configured so that the warning or machine stop signal and the release signal can both be generated from only a predetermined portion of the evaluation field in response to the first and second intrusions, respectively.

* * * * *